Dec. 11, 1956 P. R. WALTER ET AL 2,773,487

FURNACE HAVING WALLS ORGANIZED FOR CUBICAL EXPANSION

Filed Aug. 27, 1952 9 Sheets-Sheet 1

INVENTORS
Paul R. Walter
Ernest C. Witzke
BY C. F. Bryant
ATTORNEY

FURNACE HAVING WALLS ORGANIZED FOR CUBICAL EXPANSION

Filed Aug. 27, 1952 9 Sheets-Sheet 2

INVENTORS
Paul R. Walter
Ernest C. Witzke
BY
R. J. Bryant
ATTORNEY

INVENTORS
Paul R. Walter
Ernest C. Witzke
BY C. F. Bryant
ATTORNEY

INVENTORS
Paul R. Walter
Ernest C. Witzke
BY R. F. Bryant
ATTORNEY

Dec. 11, 1956 P. R. WALTER ET AL 2,773,487

FURNACE HAVING WALLS ORGANIZED FOR CUBICAL EXPANSION

Filed Aug. 27, 1952 9 Sheets-Sheet 5

INVENTORS
Paul R. Walter
Ernest C. Witzke

BY C. F. Bryant
ATTORNEY

FURNACE HAVING WALLS ORGANIZED FOR CUBICAL EXPANSION

Filed Aug. 27, 1952 9 Sheets-Sheet 6

INVENTORS
Paul R. Walter
Ernest C. Witzke
BY
C. F. Bryant
ATTORNEY

Dec. 11, 1956 P. R. WALTER ET AL 2,773,487

FURNACE HAVING WALLS ORGANIZED FOR CUBICAL EXPANSION

Filed Aug. 27, 1952 9 Sheets-Sheet 7

INVENTORS
Paul R. Walter
Ernest C. Witzke
BY
C. F. Bryant
ATTORNEY

INVENTORS
Paul R. Walter
Ernest C. Witzke
BY
C. F. Bryant
ATTORNEY

Dec. 11, 1956 P. R. WALTER ET AL 2,773,487

FURNACE HAVING WALLS ORGANIZED FOR CUBICAL EXPANSION

Filed Aug. 27, 1952 9 Sheets-Sheet 9

INVENTORS
Paul R. Walter
Ernest C. Witzke
BY
C. F. Bryant
ATTORNEY 2,773,487

FURNACE HAVING WALLS ORGANIZED FOR CUBICAL EXPANSION

Paul R. Walter, East Orange, N. J., and Ernest C. Witzke, Bayside, N. Y., assignors to Combustion Engineering, Inc., a corporation of Delaware Application August 27, 1952, Serial No. 306,604

16 Claims. (Cl. 122—6)

This invention relates to furnace walls having an inner face exposed to hot products of combustion and an outer casing secured to but spaced from said inner face.

In particular the invention is applied to the walls of furnaces for large steam generating units wherein the inner faces of the walls comprise aligned tubes through which boiler water is circulated for steam generation and the outer casings are fabricated of thin sheet steel and retained in spaced relation to said tubes with the space thus formed being filled with a suitable thermal insulator. During operation there is relative movement between said tubes and said casing due to unequal expansion and thus suitable means must be provided to accommodate this relative movement while maintaining said casing substantially gas tight and retaining the desired spacing between said tubes and casing.

It is an object of this invention to provide a furnace wall with improved means for supporting and spacing the casing from the fluid cooled tubes forming the inner face thereof.

Another object is to provide improved means for maintaining the spacing between the casing and the inner face of a furnace wall while permitting relatively different cubical expansions by the casing and by the wall and at the same time maintaining said casing substantially gas tight.

Other objects and advantages will become apparent from the following description of an illustrative embodiment of the invention when read in conjunction with the accompanying drawings wherein.

Figure 1:
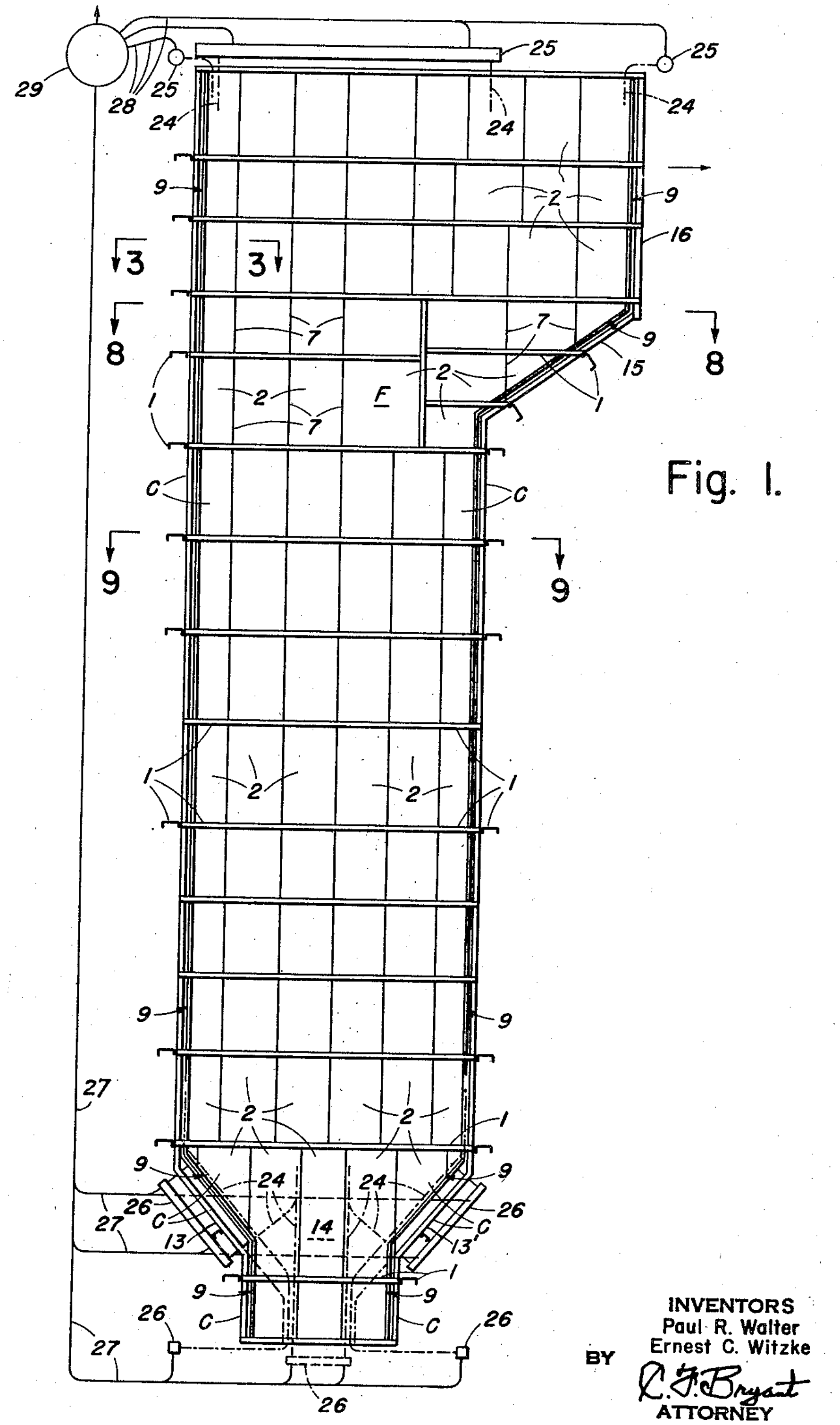
Fig. 1 is a view in side elevation of a furnace embodying the invention which view shows a typical casing for a side wall of said furnace.
Figure 9:
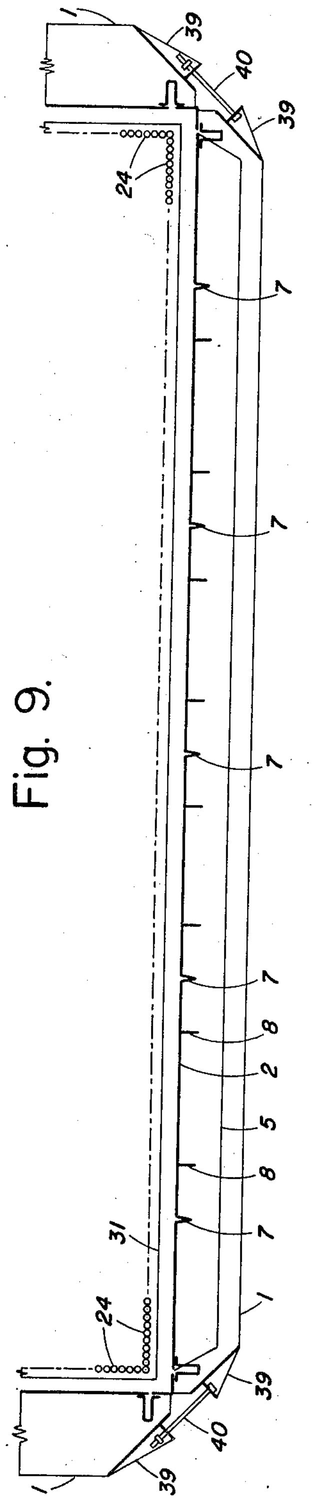
Figure 8:
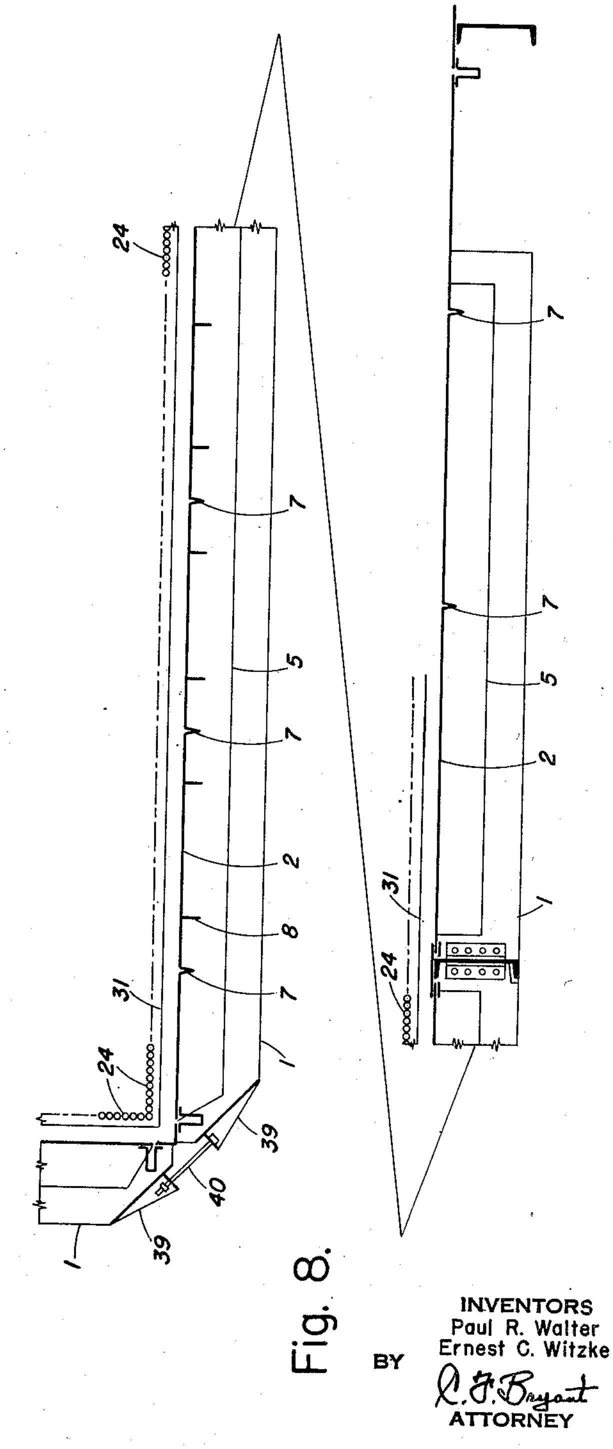

Figs. 8 and 9 are horizontal sections through a side wall of the furnace of Fig. 1 taken respectively on lines 8—8 and 9—9 of said Fig. 1.

Figure 11:
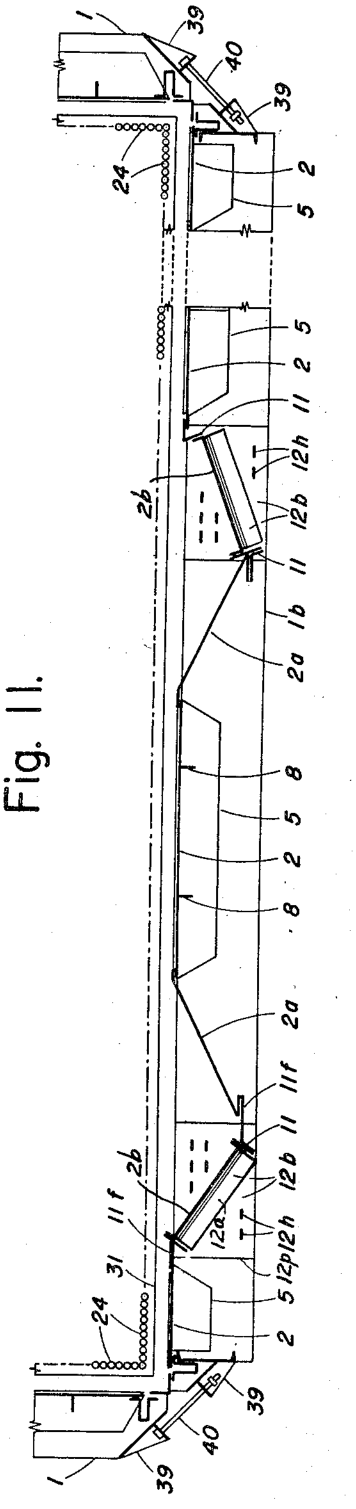
Figure 10:
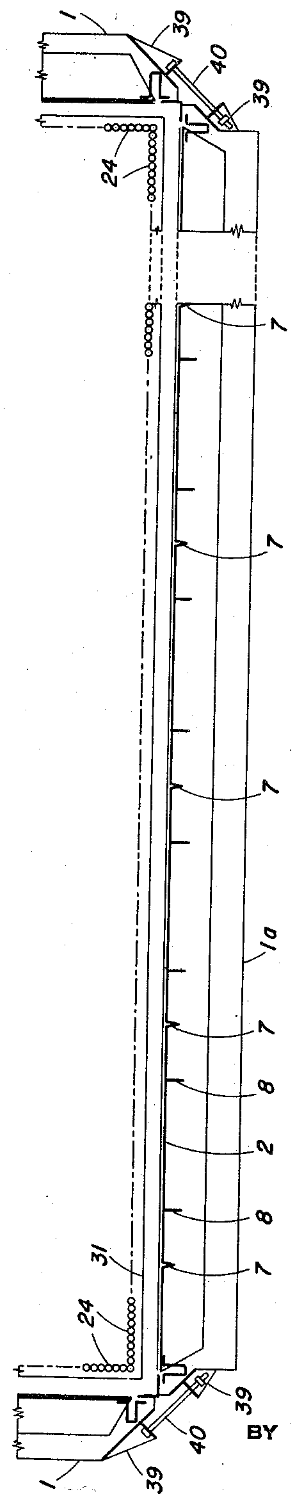
Figure 13:
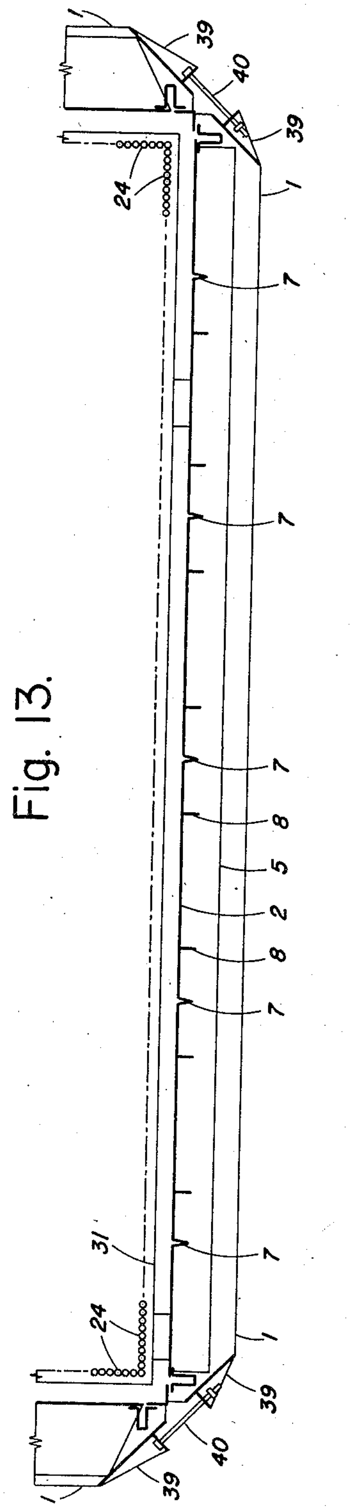
Figure 12:
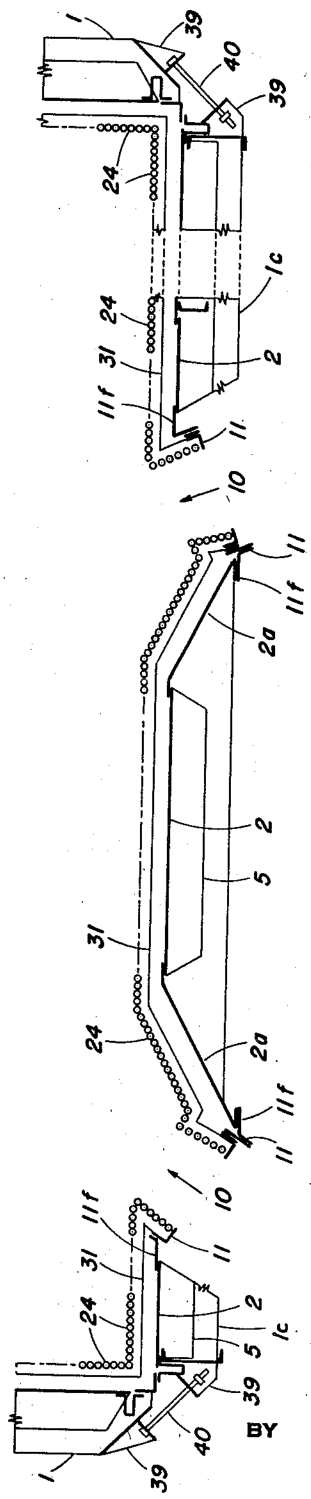

Figs. 10, 11, 12 and 13 are horizontal sections through a front wall of the furnace taken respectively on lines 10—10, 11—11, 12—12, and 13—13 of Fig. 2 with the sections of Figs. 11 and 12 being taken respectively below and through the burner openings in the furnace wall.

Figure 14:
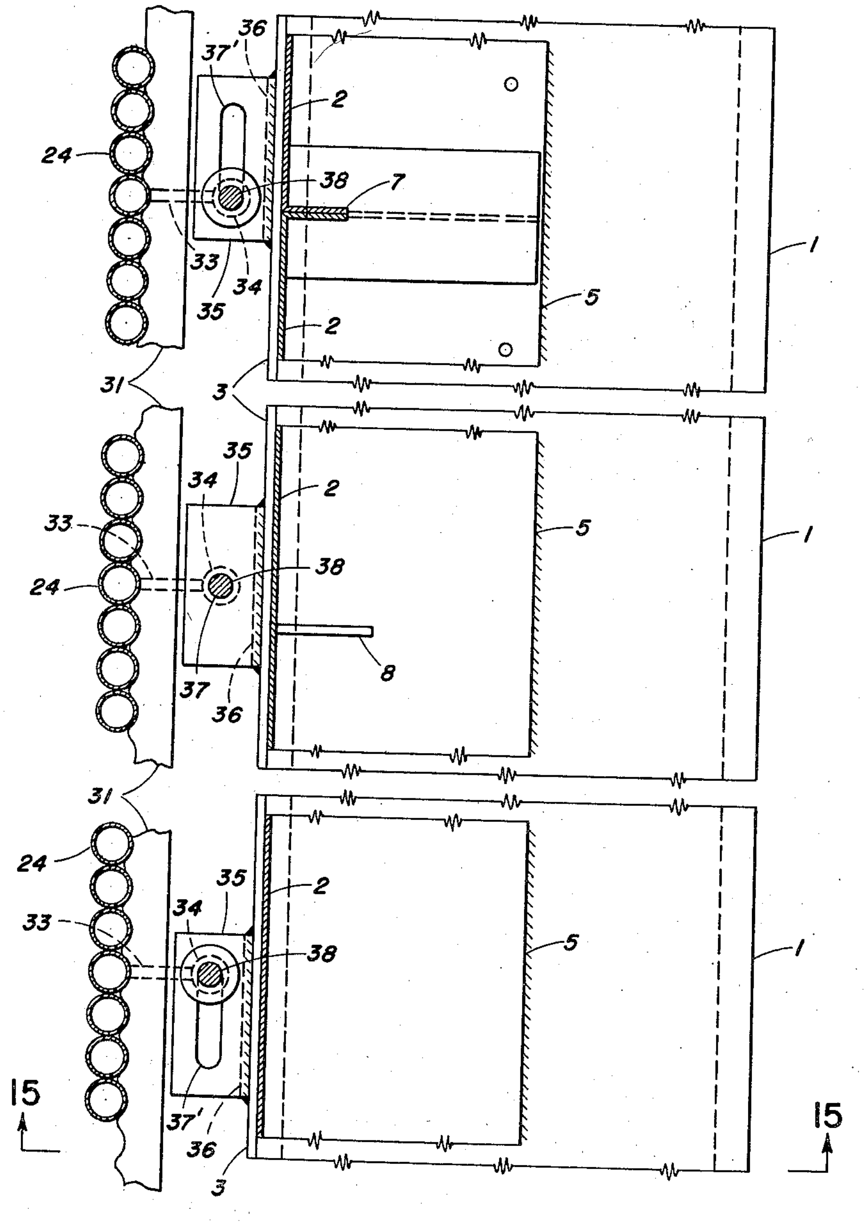

Fig. 14 is an enlarged horizontal section through a portion of one wall of the furnace showing fragments of the wall adjacent its middle section together with typical improved means for supporting the outer casing from the tubes.

Figure 15:
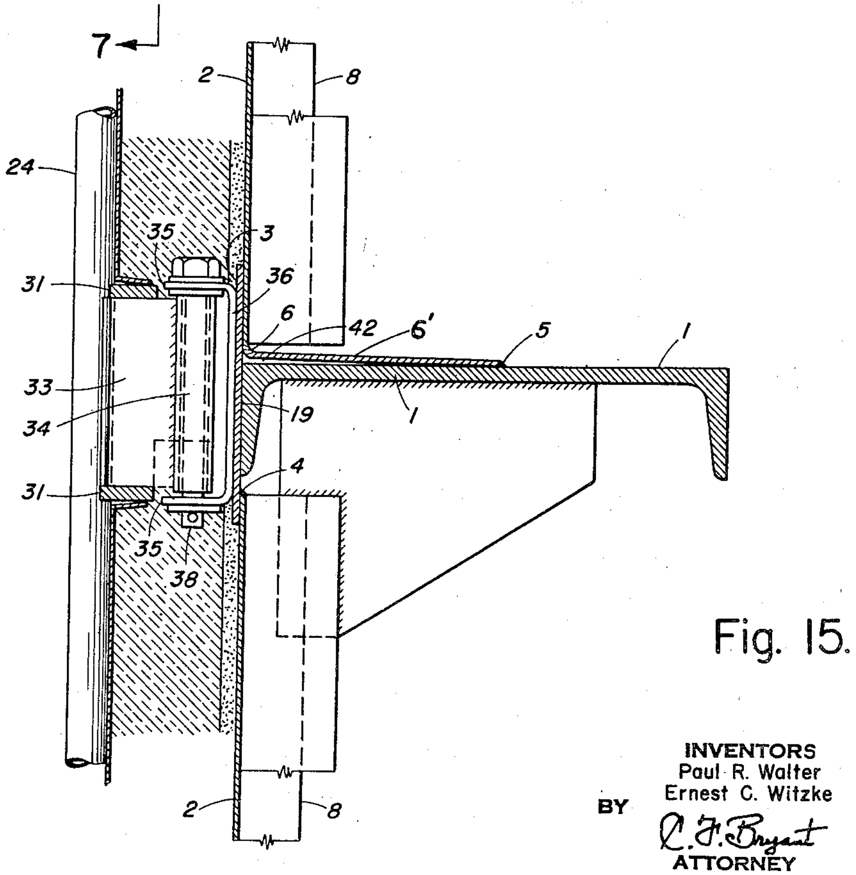

Fig. 15 is a vertical section taken generally along line 15—15 of Fig. 14 showing in detail the relation of the spacing means with the tubes, the casing and the buckstay.

Figure 2:
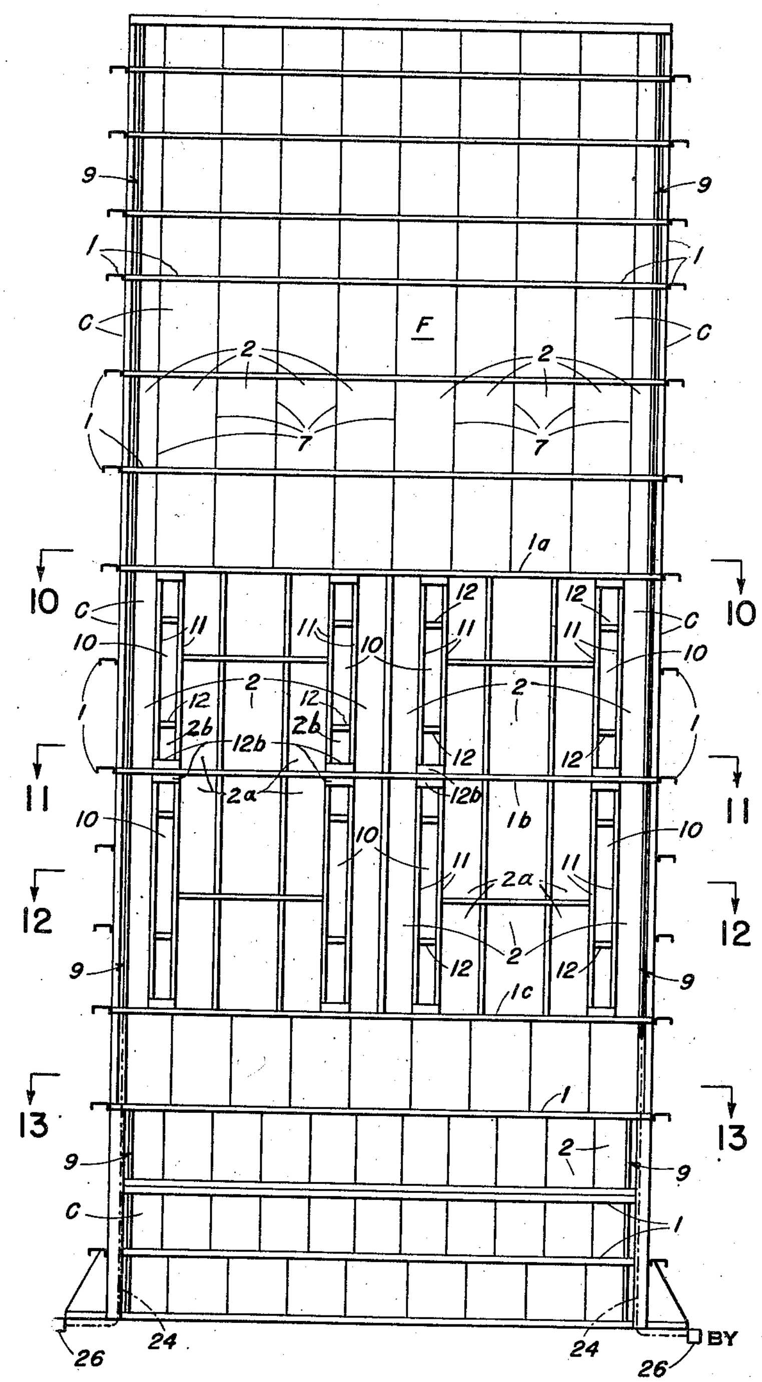
Fig. 2 is an elevation of the front wall of the furnace of Fig. 1 showing a casing structure which is in general similar to that shown in Fig. 1 except for the burner openings in the middle portion thereof.

Referring to Figs. 1 and 2, the furnace generally designated as F, is of rectangular section with each wall thereof provided with an outer casing C. Each of the casings C comprises a multiplicity of horizontally extending spaced apart stiffeners or buckstays (shown as steel channels) between which are sheet metal panels 2. Typically, each of said channels 1 has a plate 3 (Figs. 3, 15) fastened to its inner flange so that the plate 3 and channel 1 together form the buckstay with the plate extending throughout the length of the flange and projecting above and below said flange to form a backing for sheet metal panels 2. Each of the panels (except those between buckstays *1a*, *1b* and *1c* Fig 2, to be described later) extends vertically between adjacent horizontal buckstays or channels 1 and is fastened, as by welding, along one horizontal edge to plate 3 as at 4 (typically shown in Fig. 15) and along its opposite horizontal edge to the web of channel 1, as at 5. The lower portions of each of said panels 2 (Fig. 15) is bent outwardly at 6 to form a substantially horizontal flange 6' which, when welded to channel 1 along the edge 5, flexes and accommodates relative vertical movements between said panel 2 and said channels 1, as will be more fully explained hereinafter.

The panels 2 are arranged to completely fill the space between the buckstays with adjacent panels being joined along the vertical edge in a gas tight manner (Figs. 1, 2, 8, 9, 10, 13). Obviously vertical stiffeners, such as 8 (Figs. 8, 9, 10, 11, 13, 15) may be provided for the panels 2 to stiffen them against deflection due to any difference in pressure acting on the inner and outer surface of casing C. Each of the panels secured to channels 1 as aforesaid will expand horizontally with said channels and the outermost panel of each wall is provided with a vertically extending expansion joint 9 (shown in Figs. 1, 2, 3 and 4 and described hereinafter) for the purpose of accommodating the horizontal movement of the casing of one wall relative to casing of adjoining walls.

The top and bottom portions of casing C of the front wall (Fig. 2) are of a construction similar to that described above, while the middle portion between channels *1a*, *1b* and *1c*, is of a somewhat different construction due to the necessity of providing for the insertion of burners therethrough. The vertical spacing between buckstay channels *1a*, *1b* and *1c* is greater than the spacing between the remaining buckstays because the intermediate panels contain the long vertically disposed openings 10 through which burners (not shown) discharge fuel and air into the furnace. Vertical and horizontal stiffeners 11 and 12 (Figs. 2, 11, 12) frame the openings 10 and are fastened to each other.

The vertical stiffeners 11 fasten to the horizontal channels *1a*, *1b*, *1c* through members *12b*, shown generally in Fig. 2 and in detail in Fig. 11. Each member *12b* comprises a horizontal base or plate member *12p* to which is secured member *12a* of angular section having one leg parallel with and secured to said base *12p* with the other leg extending vertically therefrom and being secured to the adjacent panel *2b*. Base member *12p* of said member *12b* (Fig. 11) lies flat on the web of its associated channel here shown as *1b*, and has slotted holes *12h* provided therein for the reception of bolts in a manner to provide relative horizontal movement between said base and the channel web.

As shown in Figs. 11 and 12, vertical stiffeners 11 have extending flanges 11f which are in face to face contact with parallel ends of the adjoining panels 2 and 2a forming substantially gas tight slip joints therebetween which permit relative vertical and horizontal movement of said stiffeners and said panels. The remaining spaces betwen the buckstays 1a, 1b and 1c and adjacent the openings 10, are closed by suitable panels 2 and 2a. The panels between buckstays 1a, 1b and 1c are preferably not provided with flexible flanges 6' such as shown in Figure 15 but are fastened to said buckstays with gas tight joints, such as welds along their top and bottom edges wherefore said panels and said buckstays move vertically together.

The combined vertical expansion of the panels 2 and 2a between buckstays 1a, 1b and 1c may be accommodated by a horizontally extending expansion joint below buckstay 1c, such as by a flange 6' on panels 2 below buckstay 1c, in a manner similar to that referred to hereinbefore. In order to provide for relative vertical movement between buckstays 1b and 1c and the tubes 24 making up the inner face of the furnace wall suitable means, described in detail later, are provided for spacing said buckstays from said tubes and permitting relative vertical as well as horizontal movement therebetween.

As may be seen by reference to Fig. 1, the lower portion of the front wall (Fig. 2) is sloped inwardly to form the front wall 13 (Fig. 1) of a hopper 14 through which the ashes leave the furnace. However the construction of the panels 2 (in Fig. 2) between the buckstays 1 of the lower portion of said front wall remains similar to that of the side walls and the upper portion of said front wall.

The casing structure C of Fig. 1 is typical of the casing structure of the opposite side wall of the furnace F and the front casing structure C (Fig. 2) is likewise generally typical of the opposite or rear wall casing structure, there being burner openings in the rear wall casing substantially opposite burner openings 10 in the front wall. The principal variation of the rear wall structure from the front wall resides in the outwardly sloping upper portion 15 (Fig. 1) which terminates at the bottom of furnace outlet opening 16 through which the products of combustion leave the furnace. However, the construction of the panels 2 between buckstays 1 remains generally unchanged. As shown in Fig. 1, the bottom portion of the rear wall slopes inwardly to form the rear wall 13' of ash hopper 14. Figs. 8, 9, 10, 13 are all typical sections at various elevations through the casing C, and show the similarity of the casing structure where the burner openings 10 do not occur.

Figure 3:
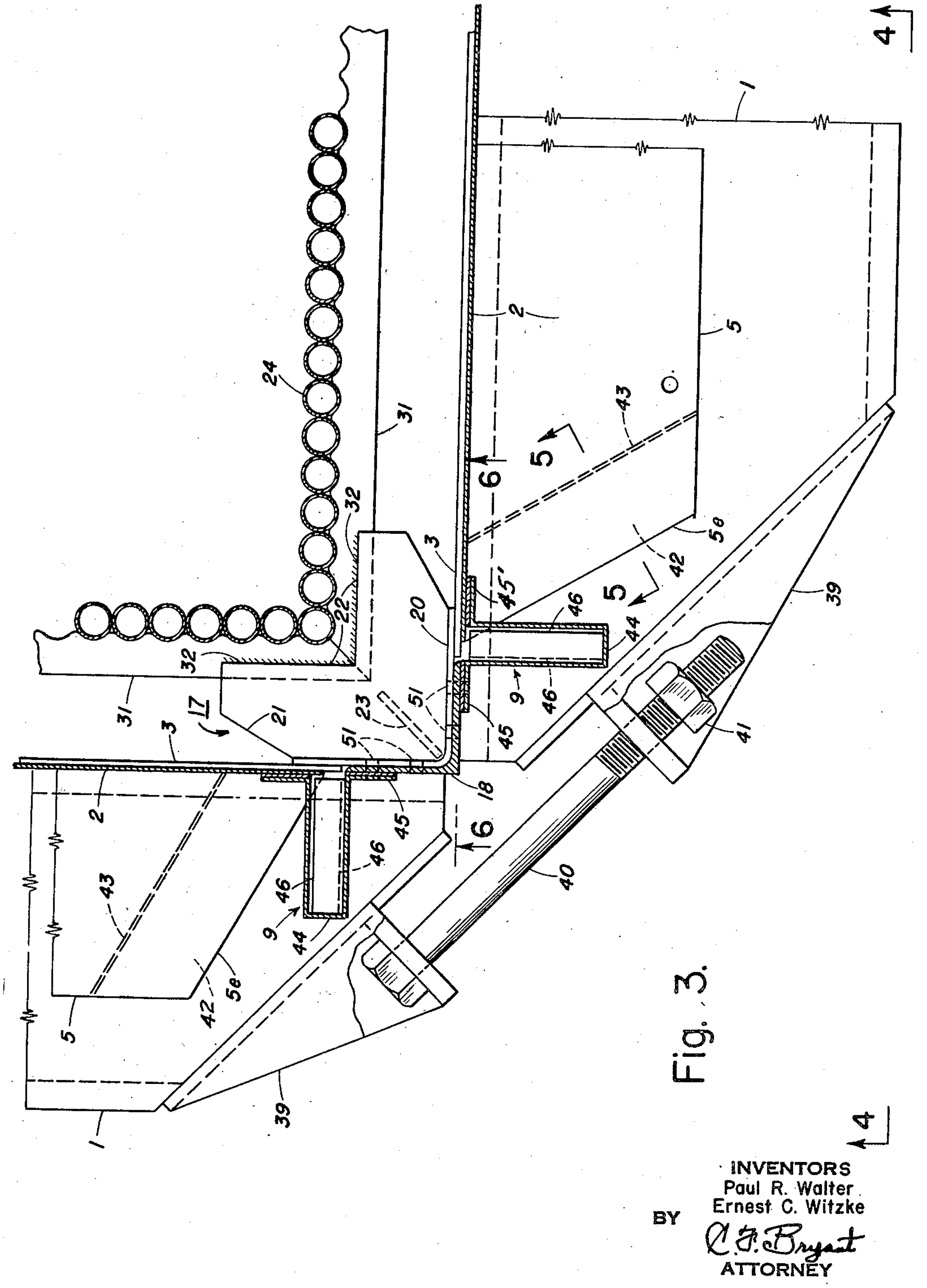
Fig. 3 is a horizontal cross section taken on line 3—3 of Figs. 1 and 4, showing a typical corner assembly located at the vertically extending corners of the furnace adjacent the horizontal buckstays.
Figure 6:
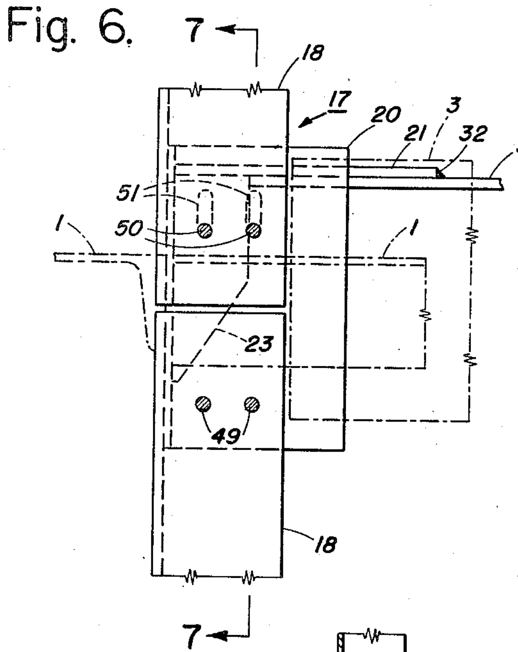
Fig. 6 is a vertical elevation taken on line 6—6 of Fig. 3, further showing a typical corner member assembly adjacent the horizontal buckstays.
Figure 7:
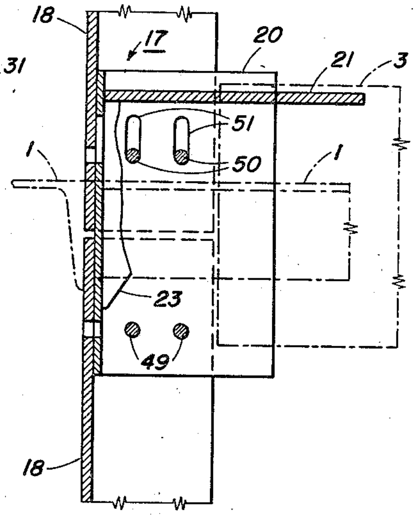
Fig. 7 is a cross section taken on line 7—7 of Fig. 6.

Vertical corner members, generally designated as 17 (Figs. 3, 6, 7), are provided adjacent the ends of each of the buckstays or channels 1, 1a, 1b and 1c. Said corner members are best shown in Figs. 3, 6 and 7 and each such member comprises an outer vertical corner angle 18 extending between adjacent channels 1 and having legs that overlie but are not fastened to, the inner surface of the inside flange 19 (Figs. 3 and 15) of said channels; an inner vertical angle 20 whose legs contact and extend horizontally beyond the legs of the outer corner angle 18 and whose legs are of sufficient length to extend the full width of plates 3 with which they are in substantially fluid tight sliding engagement; a horizontal corner plate 21 welded to the inner faces of the inner angle 20, and having its inner edges 22 (Fig. 3) forming a right angle; and a stiffening web 23 welded to angle 20 and plate 21. The legs of corner angles 18 are fastened to the legs of the inner angles 20 in a manner to provide relative vertical movement. See Figures 6, 7.

As typically shown in Figs. 3, 14 and 15, the interior walls of the furnace F are formed by a multiplicity of vertically aligned tubes 24. Said tubes are connected into the boiler circulation system by bottom and top headers 25 and 26, respectively (Fig. 1) and downcomers and relief tubes 27 and 28, respectively, the latter being connected to steam and water drum 29. Tubes 24 may be closely spaced center to center as shown or provided with longitudinal fins as is well known in the boiler art.

To maintain alignment of the tubes 24 each tube is welded to horizontal bars 31 provided at spaced distances longitudinally of the tubes. At least one such bar 31 is positioned adjacent to and parallel with each buckstay channel. Accordingly where four channels, one for each of the four walls, lie in a horizontal plane there will occur at least four bars 31 lying in a closely adjacent parallel plane. Said bars 31 are preferably welded to all of the tubes, to each other at the corners of the furnace and to the corner members 17 as shown at 32 in Figs. 3 and 6. The wall tubes 24 adjacent the burner openings 10 are offset as shown in Fig. 12 and bars 31 are arranged to follow this offset.

At spaced horizontal intervals along each bar 31 are vertical plates 33 (Figs. 14 and 15) which are welded to the bar or bars 31 and to a tube 24. A vertical sleeve or pipe 34 is welded to the outer edge of each bar 33 and fits between the flanges 35 of a channel member 36. Slots 37 are provided in the flanges of said channel members for the reception of a bolt which thereby holds and spaces the channel member 36 from the tubes 24. Said channel members 36 are fastened to the plates 3 of the adjacent buckstay channels and in this manner the buckstays are supported by tubes 24.

As described above, buckstays 1b and 1c are supported by the adjacent casing, independently of the tube wall 24 and thus these buckstays are provided with channels 36 having flanges 35 spaced sufficiently from the ends of sleeve 34 to accommodate independent vertical movement of the buckstay with respect to the tubes.

Preferably flanges 35 of the channel members 36 nearest to or at the vertical center line of each furnace wall are provided with a circular hole 37 snugly fitting bolt 38 (Fig. 14). The remaining flanges 35 of channel members 36 are then provided with longitudinal slots 37' (Fig. 14) in which the bolts 38 may move longitudinally of the buckstay. Because the bars 31 will be hotter during operation than the buckstays 1, 1a, 1b and 1c, or casing C in general, they will expand a greater distance horizontally resulting in relative movement which will be accommodated by the sliding of bolts 38 in slots 37. The expansion of the furnace walls will then occur from the center channel member 36 or the middle of the wall, outwardly toward the outer edges thereof. Corner members 17, which are fastened to the bars 31 will then move outwardly with outer angle 18 sliding along the inner face of inside flanges 19 of buckstay channels 1, 1a, 1b and 1c, since (as previously mentioned) these two members are not fastened together.

Figure 4:
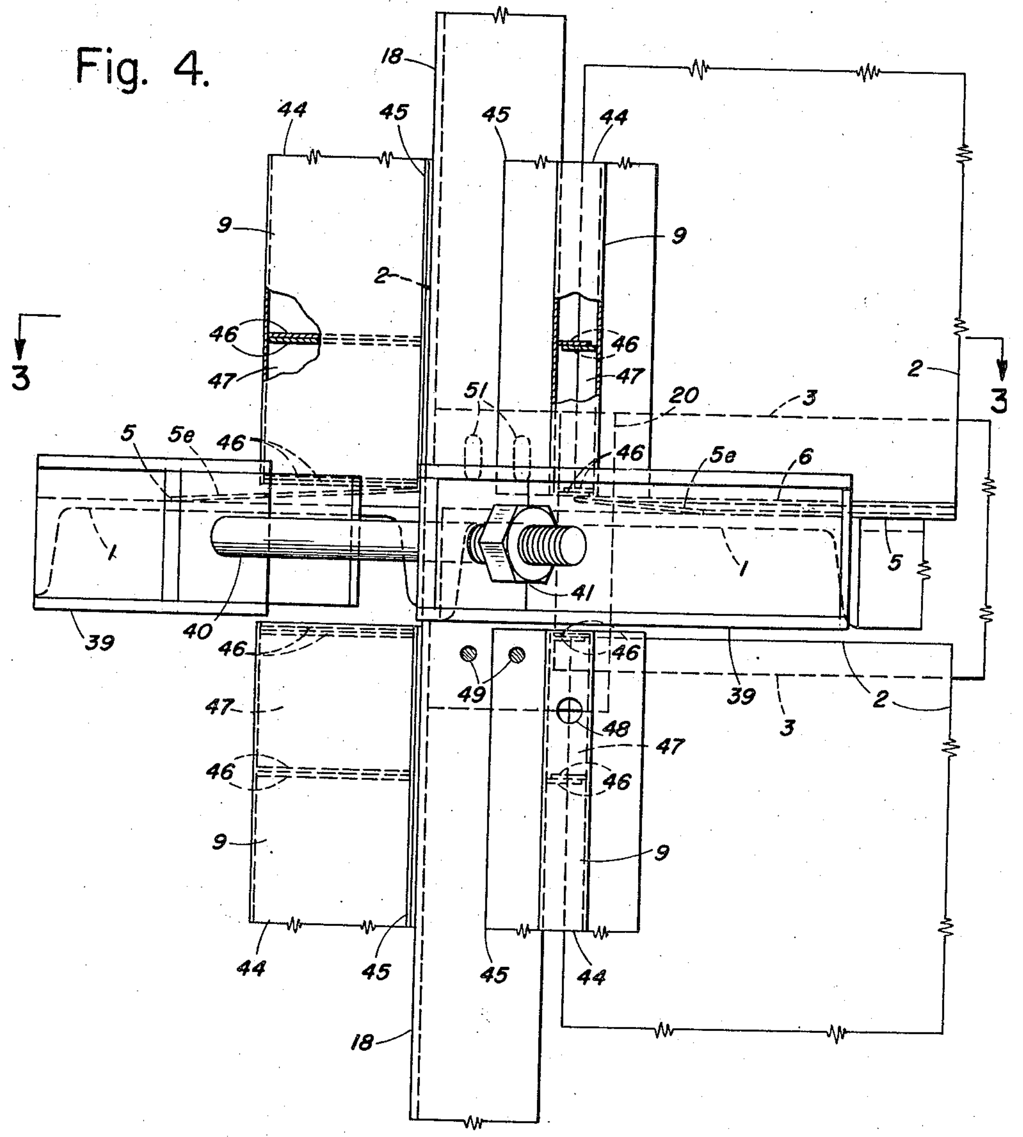
Fig. 4 is an elevation taken on line 4—4 of Fig. 3.

Buckstay channels 1 which are associated with adjacent furnace walls are disposed in the same horizontal plane and meet at the joining corners of the furnace (Figs. 3 and 4). Upon firing the furnace, the ends of said buckstay channels will depart from one another due to the greater horizontal expansion of the inner furnace wall than the outer casing wherefore each channel end will move away from the vertical corner of the furnace. In order to tie channels 1, 1a, 1b or 1c of adjacent walls together so as to resist any excessive internal furnace pressures against the walls, the ends of each channel are provided with a saddle 39 (see Fig. 3) fastened thereto having suitable holes for the reception of bolt 40. When the furnace is in full operation and the corresponding full expansion has occurred, the nut 41 on the bolt 40 (again see Fig. 3) is adjusted so as to prevent outward movement of said channels. Any excessive internal pressure within the furnace tending to move the walls and buckstays outwardly will thus be resisted by bolts 40.

Figure 5:
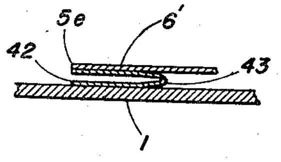
Fig. 5 is a cross section taken on line 5—5 of Fig. 3 showing a yieldable end closure for the horizontal flanged portion of a casing panel.

Relative movements due to vertical expansion are provided for as follows: As described above, buckstay channels 1 and 1*a* are supported from tubes 24 which are in turn hung from their top ends. When the furnace is in operation, the tubes will expand vertically downwardly carrying said channels with them. The increase in spacing between adjacent channels due to this tube expansion will be greater than the vertical expansion of each panel 2 due to a difference in temperature between said tubes and said panels, with this difference being accommodated by the flexing of flange portion 6′ of panel 2 (Fig. 15). As said flange 6′ lifts from the web of channel 1, it opens a triangular shaped opening 42 (Figs. 15, 3, 5) at the ends 5*e* of the panel 2 (Figs. 3, 5). To seal this opening 42 a flexible impervious member 43 is bent back upon itself and inserted into opening 42, as shown in Figs. 5 and 3, and is cemented to the flanged portion 6′ and to the channel 1.

As explained above, when the furnace is in operation vertical corner angles 18 will move horizontally outwardly a greater distance, due to expansion, than will the panels 2 and the ends of channels 1, 1*a*, 1*b* and 1*c*. This difference in movement is accommodated by vertically extending expansion joints 9 (Figs. 1, 2, 3, 4) which are associated with the vertical edge of the outermost panels of each wall adjacent the vertical corners of furnace F. A typical expansion joint 9 (Figs. 3, 4) comprises a U-shaped sheet metal member 44 which is preferably separate but may be formed from a portion of the end panel 2 and which is provided with an outer flange 45 fastened to the furnace's outer corner angle 18 and an inner flange 45′ fastened to the outermost panel 2. As the corner angle 18 moves horizontally away from said outermost panel 2 due to the horizontal expansion of the inner wall of tubes 24, the U of the expansion joint 9 opens.

In order to seal the opening at the top and bottom of said expansion joint 9 adjacent the buckstay channels, two spaced apart overlapping sets of horizontal sealing plates 46 are provided within the U of the joint (Figs. 3, 4), each set of plates being in face to face sliding contact. One plate of each set 46 is attached by a sealed joint to one leg of the U of the expansion joint 9 and the companion plate is attached by a sealed joint to the other leg. The free ends of each plate 46 opposite the sealed joint are spaced closely adjacent the opposite leg of the U bend. The two spaced apart sets of plates 46 form a chamber 47 therebetween (Fig. 4) which is packed with an elastic material, not shown, to supplement the sealing by the sets of plates against gas leakage through the ends of said U-shaped expansion joint 9. A hole 48 is provided for inserting said packing into said chamber and for inspection purposes. As shown in Figs. 3 and 4, each end 5*e* of the flanged portion 6′ of panel 2 adjacent an expansion joint 9, terminates within the limits of the U bend of said joint at its open end and contacts the outermost seal plate 46 to effect a seal therewith.

The inner angles 20 of corner members 17 are fastened to bars 31 aligning the tubes 24 and are thus indirectly supported by said tubes 24. As the tubes 24 expand vertically, the respective angles 20 move with them. The outside corner angles 18 are arranged in vertically aligned independent sections as shown (Figs. 6, 7) with each section extending between vertically adjacent corner members 17. To allow for the difference in vertical expansion movement between the tubes 24 and the corner angles 18, one end of each independent angle 18 is rigidly fastened to one of the corner angles 20, as by bolts 49 (Figs. 6, 7), and the other end is fastened to the other corner angle 20 by bolts 50 passing through vertical slots 51 in said angle 20. These slots 51 permit relative vertical movement between corner angle 20 and corner angle 18. As vertical expansion of tubes 24 occurs during operation of the furnace, the horizontal spaces between the ends of the vertically aligned sections of angles 18 (Figs. 6, 7) will widen. Being backed by the inner corner angles 20, the joints will remain substantially gas tight.

From the above detailed description it will be seen that the relative expansion movements within the furnace walls are provided for as follows:

The entire furnace casing structure C is supported by the tubes 24 which are hung from the upper headers 25 which in turn are suspended by hangers from a structural steel framing in a known manner not here shown.

The tubes 24, upon being heated by the products of combustion of the fuel burned within the furnace, expand downwardly and horizontally thereby increasing the furnace in cubical size. Sets of horizontal buckstays 1 lying in vertically spaced horizontal planes are tied to and supported by the tubes 24 and move downwardly therewith. At the corner junctures of each of the sets of buckstays are corner members 17 fastened to and supported by the adjacent tubes 24 with which they move downwardly and horizontally with tube expansion.

The vertical movement between adjacent sets of buckstays 1, which is equal to the expansion movement of the tube length therebetween, is greater than the vertical expansion movement of the casing panels 2 between said buckstays due to the rise in temperature of said tube being considerably greater than that of the panels because of the thermal insulation disposed between the two. In order to accommodate this differential movement, the casing structure C is generally divided into vertical units, each unit comprising at least one horizontal buckstay 1 vertically supported by and spaced from tubes 24 by members 31, 33, 34, 36 and 38 disposed therebetween. Each buckstay is fastened to the casing panels 2 extending horizontally above and below the buckstay with those disposed above being vertically movable relative thereto through the medium of flexible flange 6′.

Casing C is further provided with corner members 17 which are fastened to and supported by said tubes 24, and thus move therewith through the same vertical distance as the associated buckstays 1. Each such corner member provides a substantially fluid tight connection for the outer casings of adjacent walls while at the same time accommodating relative movement of said casings and of said corner member with respect to said casings. This is brought about by mounting angle 20 so that it moves with tube 24 and has sliding but substantially fluid tight contact with the ends of plate 3 of adjacent walls and securing outer angle 18 which extends vertically between adjacent angles 20 to said angles 20 via bolts 50 and vertically elongated slots 51 so that said outer angle has limited vertical movement with respect to said angle 20. Horizontal movement of angle member 17 with respect to panels 2 is accommodated through expansible joint 9 which is secured to outer angle 18 and the panel juxtaposed thereto in a substantially fluid tight manner.

Adjustable corner bolts 40 provide novel means for preventing relative movement of the casing walls beyond their normal movement due to expansion and assist tubes 24 and bars 31 in assuming the load due to any excess pressure within the furnace.

While one preferred embodiment of our invention has here been shown and described, it will be understood that such showing is illustrative rather than restrictive and that changes in construction, combination and arrangement of parts may be made without departing from the spirit and scope of the invention as claimed.

We claim:

1. In a furnace of the type described, wall structure having an inner facing exposed to hot combustion gases generated within said furnace and an outer casing spaced from and supported by said inner facing with thermal insulation interposed between said inner facing and said outer casing, said outer casing including backstays movable with said inner facing in a direction transverse to said buckstays and parallel with said inner facing, and metallic panels interconnecting adjacent buckstays, said panels having edges juxtaposed to said buckstays and rigidly interconnected therewith throughout substantially the entire length of said edges so that said panels are integral with the buckstays and said edges move therewith and are joined therewith in a fluid tight manner, each of said panels being flexible to accommodate relative movement between said adjacent buckstays in said transverse direction.

2. In a furnace of the type described, wall structure having an inner facing exposed to hot combustion gases generated within said furnace and an outer casing spaced from and supported by said inner facing with thermal insulation interposed between said inner facing and said outer casing, said outer casing including a plurality of spaced buckstays secured to said inner facing so as to move therewith in a direction transverse to the longitudinal axis of said buckstays and parallel with said inner facing, and panel means interposed between adjacent buckstays, said panel means having edges juxtaposed to said buckstays and rigidly interconnected therewith throughout substantially the entire length of said edges so that said panel means are integral with the buckstays and said edges move therewith and are joined therewith in a fluid tight manner, said panel means including a flexible flange operable to accommodate relative movement between said adjacent buckstays in said transverse direction.

3. In a furnace of the type described, wall structure having an inner facing exposed to hot combustion gases generated within said furnace and an outer casing spaced from and supported by said inner facing with thermal insulation interposed between said inner facing and said outer casing, said outer casing including a plurality of generally parallel buckstays secured to said inner facing in a manner to move therewith in a direction transverse to the longitudinal axis of said buckstays and parallel with said inner facing, panel members interposed between adjacent buckstays, said panel members having edges juxtaposed to said buckstays and rigidly interconnected therewith throughout substantially the entire length of said edges so that said panel members are integral with the buckstays and said edges move therewith and are joined therewith in a fluid tight manner, a flexible flange formed at one of the edges of said panel members in overlying relation with the adjacent buckstay, and flexible means fluidly sealing the ends of said flange with said adjacent buckstays in a manner permitting relative movement therebetween in said transverse direction.

4. Furnace wall structure having an inner surface adapted to be exposed to hot combustion gases generated within a furnace and including vertical contiguous water cooled tubes integrated into a rigid metallic structure, an outer casing supported by and spaced from said structure with thermal insulation substantially filling the space therebetween, said outer casing including a plurality of spaced buckstays extending transversely of said tubes and parallel with the plane of the wall with each of said buckstays being anchored to said structure at a particular point with said anchor points lying in substantially vertical alignment and each of said buckstays being secured to said structure at other points in a manner to permit relative movement restricted to a direction generally parallel to the longitudinal axis of said buckstays, and metallic panel means interposed between adjacent buckstays having opposite edges extending generally parallel to said buckstays and effectively welded thereto in a fluid tight manner, said panel means having a horizontal flexible flange formed adjacent one of said edges effective to accommodate relative movement between said adjacent buckstays in a direction longitudinally of said tubes.

5. A vertical furnace wall comprising an inner face lined with tubes integrated into a rigid metallic structure and an outer casing supported by but spaced from said inner face, said outer casing including a plurality of spaced buckstays extending transversely of said wall and parallel with the plane of the wall with each of said buckstays being anchored to said structure at a particular point with said anchor points lying in substantially vertical alignment and each of said buckstays being secured to said structure at other points in a manner to permit relative movement therebetween restricted to a direction generally parallel to the longitudinal axis of said buckstays, and panel means interposed between said buckstays, said panel means having edges juxtaposed to said buckstays and rigidly interconnected therewith throughout substantially the entire length of said edges so that said panel means are integral with the buckstays and said edges move therewith and are joined therewith in a fluid tight manner, said panel means having a flexible portion constructed and arranged to accommodate relative movement of said buckstays in a direction longitudinally of said tubes.

6. A furnace wall as defined in claim 5 wherein the means for anchoring said buckstays to said structure includes a member fixed in spaced relation to said structure and provided with an opening therethrough, a U-shaped bracket effectively secured to said buckstays and snugly receiving said member between the arms thereof, said arms being provided with openings in alignment with the opening in said member, and bolt means disposed within and snugly fitting said aligned openings.

7. A furnace wall as defined in claim 5 wherein the means for securing said buckstays to said structure as defined therein includes a member fixed in spaced relation to said structure and provided with a vertical opening therethrough, a U-shaped member effectively secured to said buckstays and snugly receiving said member between the arms of said U-shaped member with each of said arms being provided with an opening in alignment with the opening in said member, the opening associated with one of said members being elongated in a direction longitudinally of the buckstays, and bolt means disposed within said aligned openings thereby securing said members together.

8. A generally vertical furnace for a steam generator or the like comprising a plurality of walls joined to form a complete inclosure of polygonal transverse section, each of said walls having an integrated substantially rigid metallic means disposed on its inner face with this metallic means of adjacent walls being rigidly secured together at the juncture of said walls, a fluid tight outer casing spaced from said metallic means and constructed and arranged to be supported by said metallic means and to move vertically therewith but relative thereto in a horizontal direction parallel to the plane of the wall, and substantially gas tight corner means disposed at the juncture of adjacent pairs of said walls and supported by said metallic means, said corner means including flexible sealing members connected to the adjacent casings in a substantially fluid tight manner, said flexible sealing members including a flexible portion extending lengthwise of the juncture of said walls constructed and arranged to accommodate horizontal movement of said corner means relative to said casings.

9. A furnace for a steam generator or the like comprising at least two vertically disposed joined walls each of which includes an integrated substantially rigid metallic means disposed on its inner face with the last named means of the two walls being rigidly joined together and a gas tight outer casing spaced from said inner face, means supporting said casing in spaced relation to said metallic means, said supporting means including means permitting relative horizontal movement between said metallic means and said casing of each wall in a direction parallel with the respective wall, substantially fluid tight corner means interposed between the wall casings throughout the height thereof, said corner means including vertically spaced support members rigidly connected to the metallic means of said walls, means interconnecting said support members in a substantially fluid tight manner, said last named means including flexible sealing means connected with the adjacent casings, and means associated with said casings to limit relative horizontal movement of said casings parallel with and with respect to their associated metallic means.

10. A furnace for a steam generator or the like comprising at least two vertically disposed angularly intersecting walls joined at said intersection, each of said walls including an inner face lined with generally vertical tubes rigidly secured together to form a rigid structure with these structures of each wall being secured together at the juncture of said walls and a gas tight outer casing supported by these structures but spaced from said face, said outer casing including at least two spaced buckstays extending transversely of said tubes and parallel with the plane of the wall with each of said buckstays being anchored at a particular point to said structure in spaced relation to said inner face with said anchor points lying in substantially vertical alignment and each of said buckstays being secured at other points to said structure in spaced relation to said face and in a manner to permit relative movement between the buckstay and said structure restricted to a direction generally parallel to the longitudinal axes of said buckstays, panel means interposed between said buckstays and effectively secured thereto in a substantially fluid tight manner, said panel means having a flexible portion constructed and arranged to accommodate relative movement between said buckstays in a direction longitudinally of said tubes, means effectively interconnecting the casings of each of said walls at the juncture thereof in a substantially fluid tight manner, said last named means including a corner piece supported by the rigid tubular structure lining the inner faces of said walls and including flexible seals connecting the panels of said outer casings with said corner piece in a manner to permit relative horizontal movement therebetween.

11. A furnace as defined in claim 10 wherein at least a number of the buckstays of one of the walls are in horizontal alinement with the buckstays in the other wall with adjacent ends of said buckstays of each of said walls interconnected by means effective to limit relative outward movement of said buckstays.

12. A generally vertical furnace for a steam generator or the like comprising a plurality of walls joined to form a complete inclosure of polygonal transverse section each of said walls including an inner face having disposed thereon vertically disposed water cooled tubes rigidly joined together to form a rigid structure with these structures of each of said walls being rigidly joined at the juncture of said walls and a fluid tight metallic casing fixedly spaced from said inner face with thermal insulation substantially filling the space therebetween, said casing being secured to and supported by said rigid structure by means disposed in vertically spaced horizontal rows, said last named means being constructed and arranged to provide for relative horizontal movement parallel to the plane of the wall between said casing and said inner face except along a vertical line intermediate the longitudinal edges of said casing, said casing including means to accommodate relative vertical movement between said horizontal row means, and corner means secured to and supported by said rigid structure and interconnecting the casings of adjoining walls at the juncture of said walls in a substantially fluid tight manner, said corner means being constructed and arranged to accommodate horizontal differential movement between itself and the casings with which it is associated.

13. A furnace as defined in claim 12 including means for limiting relative outward movement of said casings.

14. In a furnace of the type described, two angularly intersecting vertical walls joined along a plane of intersection, each of said walls including an inner facing formed of numerous vertical contiguous tubes fixedly secured together with said facing of said walls being secured together at the juncture thereof, a gas tight outer casing supported by but spaced from said wall facing, said outer casing including a plurality of generally horizontal buckstays spaced longitudinally of said tubes with the corresponding buckstays of the two walls lying in common horizontal planes, each of said buckstays being anchored in spaced relation to the said inner wall facing associated therewith at a particular point with said anchor points lying in substantiallly vertical alignment and each of said buckstays being effectively secured in spaced relation to said facing at other points in a manner to permit relative movement between the buckstay and said facing restricted to a direction generally parallel to the longitudinal axis of said buckstays, said buckstays including at their innermost portion a plate member in parallel relation with the inner facing of the wall, metallic panel members interposed between vertically displaced buckstays and having opposite edges extending generally parallel to said buckstays with one edge secured to said plate member adjoining one of said buckstays and the other edge secured to the other buckstay, a flexible flange formed at the edge of said panel secured to said buckstay in overlying relation with said buckstay, flexible means fluidly sealing the ends of said flange with said buckstay in a manner permitting limited relative movement therebetween, means effective to interconnect the casings of each of said walls at the juncture thereof in a substantially fluid tight manner, said last named means including a corner piece having a support member disposed in generally parallel relation with said common planes and rigidly secured to the inner facing of the intersecting walls, an angular sealing member secured to said support member and having at least as great a vertical length as said plate members, said angular member having walls in substantially fluid tight but sliding engagement with the plate member at adjacent ends of the buckstays of each of said walls, a corner member overlying said angular member in a substantially fluid tight manner and spanning the vertical distance between vertically displaced angular members one end of said corner member that corresponds to the flanged end of said panels being secured to its corresponding angular member in a manner permitting limited vertical movement between said corner member and said angular member and with the other end of said corner member being rigidly secured to its corresponding angular member, and flexible seal means securing said corner member to adjacent panels in a manner permitting relative horizontal movement therebetween.

15. A furnace wall having an inner face lined with integrated rigid metallic means and an outer casing supported from said metallic means in spaced parallel relation to said inner face with said space having heat insulation disposed therein, said outer casing including a plurality of generally parallel laterally spaced buckstays secured to said metallic means in a manner to move therewith in a direction transverse to the longitudinal axes of said buckstays and parallel with the plane of the wall, panel members interposed between adjacent buckstays, said panel members having edges juxtaposed to said backstays and rigidly interconnected therewith throughout substantially the entire length of said edges so that said panel members are integral with said buckstays and said edges move therewith and are joined therewith in a fluid tight manner, each of said panel means including a flexible portion extending in the longitudinal direction of the buckstays and effective to accommodate relative movement of said buckstays in a direction transverse to their axes and parallel to said inner face.

16. An elongated furnace for a steam generator or the like comprising a plurality of walls joined to form an elongated enclosure of polygonal transverse section, each of said walls having a substantially rigid inner metallic facing with this facing of adjacent walls being rigidly secured together at the juncture of said walls, a fluid tight outer casing spaced from said metallic facing and constructed and arranged to be supported by said metallic facing and to move therewith in a direction longitudinally of the furnace axis but relative thereto in a direction laterally of the furnace axis and parallel with said metallic facing, and substantially gas tight corner means disposed at the juncture of each of said walls and supported by said metallic facing, said corner means including flexible sealing members connected to the adjacent casings in a substantially fluid tight manner, said flexible sealing members including a flexible portion extending lengthwise of the corner and being operative to expand and contract to accommodate movement of said corner members relative to said casing in a direction laterally of the furnace and parallel with the casing.

References Cited in the file of this patent

UNITED STATES PATENTS

| | | |
|---|---|---|
| 1,032,753 | Harrison | July 16, 1912 |
| 1,295,535 | Lister | Feb. 25, 1919 |
| 1,814,555 | Jacobus et al. | July 14, 1931 |
| 1,922,599 | Murray | Aug. 15, 1938 |
| 2,120,129 | Hardgrove et al. | June 7, 1938 |
| 2,144,598 | Brinckerhoff et al. | Jan. 17, 1939 |
| 2,228,938 | Wood | Jan. 14, 1941 |
| 2,333,777 | Godshalk | Nov. 9, 1943 |
| 2,536,039 | Craven | Jan. 2, 1951 |
| 2,583,599 | Schoessow | Jan. 29, 1952 |
| 2,655,238 | Langvand | Oct. 13, 1953 |